July 14, 1936.   E. L. HENSON   2,047,203

METHOD OF AND APPARATUS FOR DETERMINING THE WEIGHT OF FLOWING GRAIN

Filed March 5, 1934   2 Sheets-Sheet 1

INVENTOR;
ELMER L. HENSON
BY Bruce S. Elliott
ATTORNEY

July 14, 1936.  E. L. HENSON  2,047,203
METHOD OF AND APPARATUS FOR DETERMINING THE WEIGHT OF FLOWING GRAIN
Filed March 5, 1934  2 Sheets-Sheet 2

INVENTOR:
ELMER L. HENSON
BY Bruce A. Elliott
ATTORNEY

Patented July 14, 1936

2,047,203

UNITED STATES PATENT OFFICE 2,047,203

METHOD OF AND APPARATUS FOR DETERMINING THE WEIGHT OF FLOWING GRAIN

Elmer L. Henson, Clarksville, Tenn.

Application March 5, 1934, Serial No. 714,075

21 Claims. (Cl. 83—44)

The broad object of this invention consists in directing a flow of grain to cause it to impinge on and flow over an inclined fulcrumed scale plate to thereby place and maintain the same in a state of unstable equilibrium, and so proportioning the scale plate relative to the momentum of the grain impinging thereon and the dead weight while flowing therefrom that, for a given standard of grain, the impact weight value of the grain on the scale plate will substantially exactly equal its dead weight value.

Another object of the invention is to regulate the flow of the grain to the scale plate so as to keep it uniform by periodically and uniformly varying the feed of the grain from a source of supply to cause the quantitative feed of the grain to alternately exceed and be less than, the quantitative flow of an ultimate stream, thus producing an aggregate stream of grain whose weight factor per unit of time is substantially unvarying, and indicating the rate of flow of the aggregate stream in terms of weight, or otherwise.

Another object of the invention consists in maintaining a uniform flow of grain to the scale plate by utilizing the changes in the position of the scale plate, effected by variations in the rate of flow of the grain to the scale plate, to produce such variations uniformly and periodically.

As relates more particularly to the apparatus, another object of the invention consists in causing the grain to flow over two inclined planes, one of the planes being in the form of a fulcrumed plate forming a part of the scale, and being positioned to receive by impact the flowing grain from the other plane, and so proportioning and relating the parts that the distance the grain flows to the fulcrumed scale plate, the degree of incline and co-efficient of friction of the surface of the plane over which it flows and the effective distance from its fulcrum the grain impinges upon the scale plate, the distance the grain flows on the scale plate, the degree of incline and the co-efficient of friction of the latter, and the effective distance of the flow from the scale plate fulcrum, that approximately one-half of the total weight on the scale plate results from the impact force of the grain impinging thereon, and one-half from the dead weight of the grain flowing therefrom.

Another object is to provide a movable scale plate adapted to be placed in a condition of unstable equilibrium by means of a quantitatively controlled stream of grain caused to impinge on said scale plate, and to operate variable speed mechanism, controlling the flow of the grain to the scale plate, by the movement of the scale plate, caused by variations in such flow of the grain thereto, said scale plate operating, in its movement in one direction under the weight of the flowing grain, to close the circuit to one side of said variable speed mechanism, whereby to decrease in quantity the stream of grain impinging on the scale plate, so that the latter, under a lessened weight, may move in a direction opposite to that caused by the initial flow of the grain, to close the circuit to the opposite side of said variable speed mechanism to increase the rate of feed of the grain to the scale plate, such changes in the rate of feed of the grain causing alternate variations in the quantitative flow, which are complemental to each other, whereby an aggregate stream may be produced practically uniform in rate of flow.

Another object of the invention is to provide an inclined fulcrumed scale plate maintained in a condition of unstable equilibrium by the flow of grain thereon, and to so proportion the distance of flow of the grain measured from a point of origin to the point of impact of the flowing grain with the scale plate, relative to the length of the scale plate from such point of impact to its discharge end, that the weight factor of the grain on the scale plate, which is the resultant of the impact of the grain therewith at a determined distance from its fulcrum and its dead weight effective for the distance the grain slides over said scale plate, shall substantially exactly equal the weight factor of the grain flowing onto the scale plate, which is its impact weight for the distance it travels from the point of origin to the point of impact with the scale plate; and, further, to so proportion the scale plate relative to the point of impact therewith of the flowing grain, that the impact weight value and the dead weight value of the grain on the scale plate, shall be the same. Thus, variations in the rate of flow of the grain to the scale plate will produce a corresponding change in the rate of flow from the scale plate, thus enabling me to deal with various kinds of grain, or the same kind of grain in various conditions.

With the scale plate proportioned as above, it is another object of the invention to periodically and uniformly vibrate the scale plate back and forth in a manner to cause a periodic and uniform change in the rate of flow of grain to the scale plate, through the medium of feed mechanism driven by variable speed mechanism, which latter is controlled by changes in the position of the scale plate, as above set forth.

Another object of the invention is to combine with my improved weighing machine a sacking attachment synchronized with the weight indicator in such manner that definite quantities of grain may be delivered periodically from the discharge chute of the machine.

Another object of the invention is to interpose a rheostat in the circuit of the variable speed device, which is automatically cut out to decrease resistance in the circuit of the variable speed device when it is desired to rapidly speed up the latter to increase the flow of grain, and is automatically cut into the circuit of said device to increase the resistance, when it is desired to rapidly decrease the speed thereof and correspondingly decrease the feed of the grain.

Other objects of the invention reside in novel combinations and operations of parts in the use of which the objects of the invention above outlined are attained.

The broad object of the invention is accomplished, in the preferred form of the invention, by causing the flowing grain to impinge upon a vibratable scale plate, proportioned to function as described, and thereby place the same in a state of unstable equilibrium from an over-balanced position, or state of rest. The scale plate is associated with a scale beam, and is over-balanced by weighting one end of the scale beam to the amount required to produce a desired rate of flow. The amount of weight required to produce a given rate of flow may first be empirically determined by placing the machine in operation and weighing the amount of grain discharged in a unit of time, and varying the amount of weight effective to overbalance the scale beam until a desired rate of flow, such as forty, fifty or sixty pounds of grain per minute, is secured. The scale beam may then be calibrated in the usual way, if the weight is adjustable thereon; or a schedule of weights for producing various rates of flow, maintained, if the weights are to be placed on a platform mounted on the scale beam, as is the case with the type of scale I have illustrated in the drawings. This initial change in position of the scale plate from a state of rest to a state of balance is caused to effect a decrease in the quantitative feed of the grain to the scale plate, which, in turn, due to the lessened weight of the grain passing onto the scale plate, permits the latter to move toward its initial position, thereby again causing an increase in the quantitative flow of the grain to said member. These changes in position of the scale plate are produced through the medium of a speed-changing device controlling the rate of flow of the grain to the scale plate, and the speed of which is automatically alternately increased or decreased in synchronism with the respective extreme positions assumed by the scale plate, which results in producing an alternate and uniform increase and decrease in the quantitative flow of grain to the scale plate above and below a desired ultimate quantitative flow from the scale plate, so that an average rate of flow of grain from the machine will result which will be practically unvarying in the quantitative factor. The weight of grain flowing from the machine for a given period of time is then accurately determined by a suitable counting device, synchronized for any predetermined rate of flow for which the device may be adjusted.

Referring now to the drawings.

Figure 1:
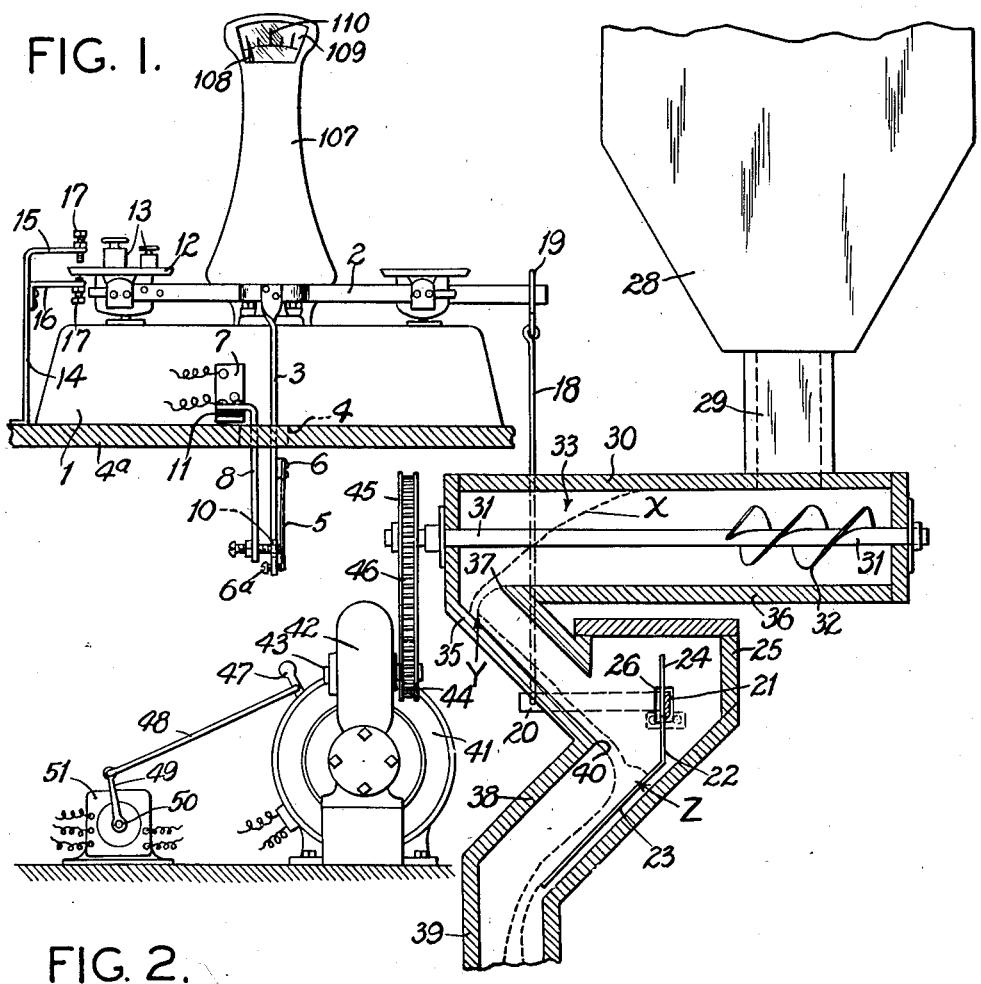
Figure 1 is a view partly in elevation and partly in transverse section of a machine constructed according to my invention.

Referring now to the drawings, the numeral 1 indicates the base of a scale having a balanced scale beam, 2, centrally mounted thereon. Secured at its upper end to the center of the scale beam 2, is a depending arm, 3, which extends through an opening, 4, in an elevated support, 4a, on which the scale is mounted, and has secured on its lower end portion a relatively long contact spring, 5, the latter being secured at its upper end to the arm 3, as indicated at 6. The spring 5 is held under slight tension by an adjusting screw, 6a, mounted in the lower end of arm 3. This prevents vibration of the spring at all times, and insures that its contact, later referred to, shall always occur at the same point. Secured on the base of the scale is a plate, 7, on which is mounted the upper end of a rigid arm, 8, which extends downwardly through the opening 4, in the support about the same distance as the arm 3. Mounted in the lower end of the arm 8, is an adjustable contact screw, 9, which is adapted to project through an opening, 10, in the lower end of the arm 3, to make contact, in a certain position of the parts, with the contact spring 5. The arm 8 is insulated from the plate 7, as indicated at 11. On one end, (the left as shown in Figure 1) of the scale beam 2, is mounted a platform, 12, for receiving weights, 13. Mounted on the support 1, adjacent this end of the scale beam, is an upright, 14, having parallel arms, 15, 16, extending inward above and below the platform 12, and each of which is provided with an adjusting screw, 17, the positions of which determine the range of movement of the scale beam, to prevent any excessive accidental movement thereof in one direction or the other. Normally, however, after the scale beam has been put in a state of balance, or more exactly, unstable equilibrium, by the weight of flowing grain, as later explained, the platform will move between the set screws 17, without engaging either of them.

Figure 2:
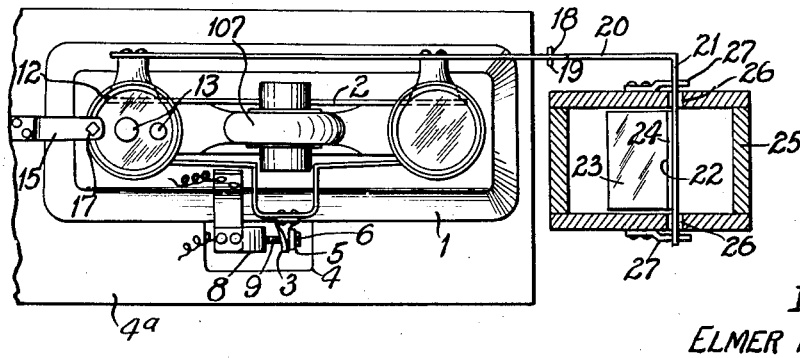
Figure 2 is a plan view of the scale and a horizontal sectional view through the housing of the scale plate, the sectional part of the view being taken on the line 2—2 of Figure 1.

Depending from the opposite end of the scale beam 2 is a rod, 18, which is loosely secured at its upper end to a fulcrum clip, 19, supported near the outer end of the scale beam 2. The rod 18 is pivotally connected at its lower end to the outer end of a flat metal bar, 20, which is bent at right angles to itself at its other end to form a second arm, 21, the bars 20 and 21 forming an angle-lever (Fig. 2), which is secured to a scale plate, 22, having an inclined portion, 23, and a vertical portion, 24, the latter extending upward into a housing 25. The bar 21 is secured to the front side of a vertical portion 24 of the scale plate, and projects through openings, 26, in opposite side walls of the housing 25. On its lower edge it is provided with notches having knife edge portions, which notches receive knife edge plates, 27, secured on opposite sides of the housing 25, as shown by Figure 2. Side play of the bar is thus prevented. The construction of parts involved in the feeding of the grain to the scale plate 22 will now be described.

The numeral 28 indicates a bin which may be considered as the source of the grain to be weighed. Depending from the bottom of the bin 28 is a spout, 29, which communicates with a horizontal housing, 30, in the opposite ends of which are mounted the ends of a shaft, 31, operating a spiral feeder, 32. The spiral of the feeder extends only part way the length of the shaft 31 from the remote end thereof, terminating at its inner end a short distance beyond the opening of the spout 29, leaving a considerable portion of the interior of the housing 30 empty, except for the shaft 31, as indicated by the numeral 33. In this portion of the housing the grain fed from the spout 29 is free to collect before being forced out of the housing by the action of the feeder 32. At the inner end of the housing an inclined chute, 34, leads from said housing to the housing 25, the bottom, 35, of said chute constituting a grain slide, which bears a certain relation in length to the scale plate 22, as later explained. The inner end, 37, of the bottom, 36, of housing 30 forms one side of the opening of the chute 35, and constitutes the line of overflow for the grain from the housing 30 to the inclined bottom 35 of chute 34. As shown by the dotted line X in Figure 1, the surface of the bulk of grain in the housing 30, beyond the feeder 32, will assume an inclined position from the spout 29 to the point 37, over which it flows, and in operation a volume of grain of substantially uniform depth will flow over the inner end 37 of the bottom of the housing 30, and fall in a comparatively shallow stream onto the inclined 35, striking the same at the point indicated by the letter Y. The grain flows over the inclined surface 35 onto the scale plate 22, the impact of the grain with the scale plate occurring at the point indicated by the letter Z. The inclined portion 23 of the scale plate is located near the bottom of an inclined housing, 38, which forms a continuation of the housing 25, and terminates in a vertically disposed chute, 39. Both the inner surface of the incline 35 and the upper surface of the incline portion 23 of the scale plate are of the same material and are perfectly smooth, and both have the same angle of inclination to the vertical, which is substantially 45°. The co-efficient of friction of said inclines will therefore be the same. I so proportion the distance from the point of origin Y to the lower end, 40, of incline 35, and the distance from end 40 to the point of impact Z, and from the impact point Z to the lower end of the scale plate, that a definite and uniform relation will always be maintained between the weight factors of the grain flowing over these respective surfaces. In the case of the incline 35, the weight factor is the impact weight value of the grain flowing over the incline from the point of origin Y to the point of impact Z. In the case of the plate 22, the total weight factor is the resultant of the impact of the grain with the scale plate, and the dead weight of the grain flowing over the scale plate from the impact point Z to the lower end of the scale plate. In the arrangement shown, these two weight factors are approximately the same.

In the construction illustrated, the distance from the point of origin Y to the lower end 40 of the inclined surface 35, is 11 inches; and the length of the inclined portion 23 of the scale plate is 11 inches. The distance across the chute 38 from the point 40 to the scale plate is 4¼ inches, and the distance from the impact point Z to the lower end of the scale plate is approximately 9.6 inches. These proportions, or similar relative proportions, plus equal inclines of the surface 35 and 23, and equal co-efficients of friction of said surfaces, insure equality in weight value of the grain flowing over the incline 35, and the grain impinging upon and flowing over the incline 23. These proportions take into account the travel of the grain from the point 40 to the scale plate in an unsupported condition, that is, without friction, and the distance from the fulcrum the two weight forces act, which in this instance would be approximately 4¼ inches. Omitting calculations, it is believed sufficient to merely state the physical laws on which I rely for securing uniformity in the weight factors of the grain flowing on the inclines 35 and 23. These may be stated as follows: The impact at the point Z will vary in proportion to the speed of the flowing grain. The dead weight of the grain from impact point Z to lower end of plate 23 will also vary in proportion to the speed. It follows, therefore, that impact weight and dead weight will vary inversely in direct proportion, the one to the other.

I have heretofore stated that the impact and dead weight values of the scale plate are equal. This is a highly important feature of the invention, as with a sluggish flow of grain, as occurs when the grain is damp, the point of impact of the grain on the plate would be slightly lower than indicated by the point Z, which would be the point of impact for grain in a normally dry condition, in which the grain flows freely. Also, there will be a difference in the point of impact of the grain with the scale plate as between a stream of light grain, such as oats, and a stream of heavy grain, such as wheat.

From the foregoing, it will be readily apparent that should the stream of grain due to slower speed impinge on the plate at a point lower down thereon than that indicated at the point Z, the impact weight value would be decreased, but the dead weight value for the same reason would be correspondingly increased. When, however, the grain is in condition to present a normal speed of flow, and the impact occurs at the point indicated by Z, then the impact weight value will be exactly equal to the dead weight value.

Thus it will be seen that with the proportions and arrangement described, the scale will always exactly compensate for any change in the speed of flow of the grain from the normal speed of flow, so as to maintain the total weight factor. It therefore follows that if an enforced and uniform variation in the feed of the grain to the incline 35 is effected in a manner to cause alternate increases and decreases in the quantitative feed of the grain in exact proportion to each other, an ultimate, aggregate stream will flow from the machine which will be practically unvarying in its weight factor. So far as I am aware, this enforced and uniform variation in the feed of the grain to the scale plate, which, as later explained is initiated and automatically controlled by the resultant back and forth movement of the scale plate, distinguishes my invention from all other schemes for weighing flowing grain, which attempt to compensate for unavoidable variations in the flow of the grain from a source by decreasing or increasing the rate of flow in response to such variations. According to my method, the factor of accidental variations in the flow of the grain to the scale plate, which variations would naturally lack uniformity, is practically entirely eliminated. And this for the reason that even with the best known scales working on this principle, experience has shown that it is impossible to regulate the flow of the grain in a manner to accurately compensate for such unequal variations in flow, with the result that the ascertained weight of the flowing grain is scarcely ever more than approximately correct, within fairly wide limits of error.

By substituting for an unregulated gravity flow of the grain to the scale plate, wholly lacking in uniformity, an enforced flow of grain, definitely caused to be alternately increased and decreased to a uniform degree, I reduce the factor of error to a negligible amount, enabling me to secure the correct weight of a stream of flowing grain, regardless of its test weight per bushel, the moisture content of the grain, or other natural variations in its characteristics. The apparatus, with the electrical system employed, by means of which I secure definite variations in the feed of the grain relative to changes in the position of the scale plate, will now be described.

Figure 3:
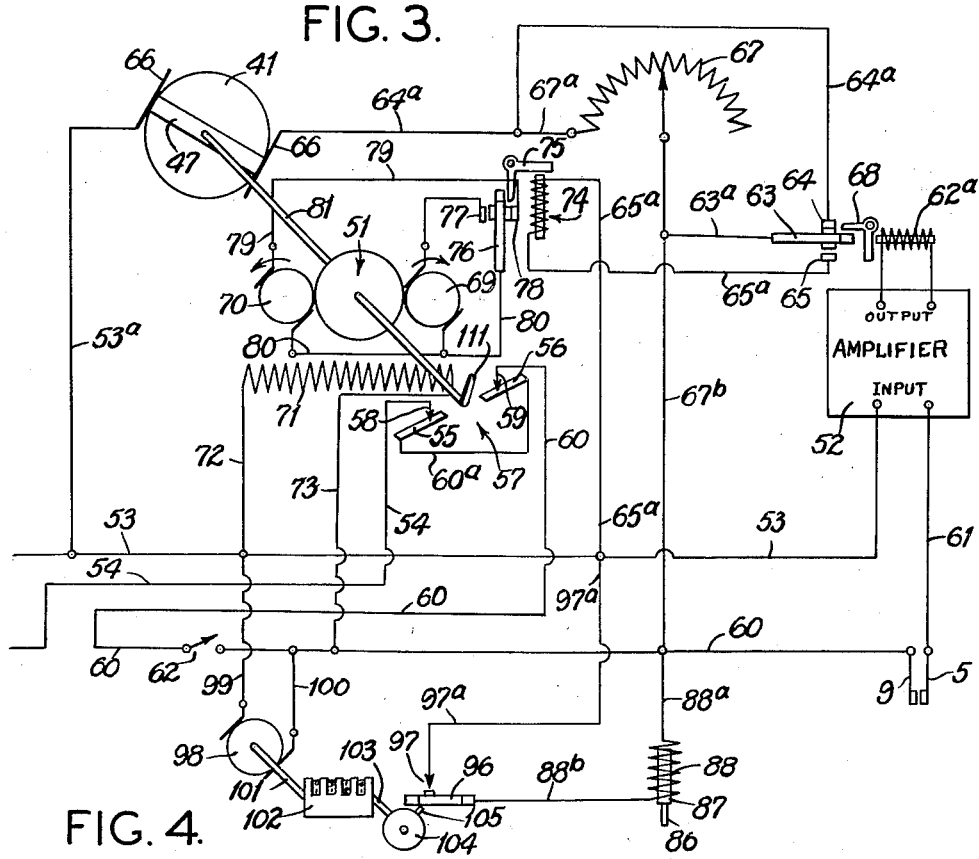
Figure 3 is a diagrammatic view in the nature of a wiring diagram, illustrating the control of the variable speed motor.

The numeral 41, Figure 1, indicates a variable speed motor of the brush shifting type, having conventional reduction gearing, 42, on the shaft, 43, of one member of which is a small sprocket wheel, 44. Mounted on the inner end of the shaft 31 of a feeder 32 is a relatively large sprocket wheel, 45, a sprocket chain, 46, connecting the two sprocket wheels. The numeral 47 indicates the shiftable member carrying the brushes (not shown) of motor 41, the same being connected by means of a link, 48, with a lever arm, 49, secured on the shaft, 50, of a reversing motor, 51. In order to vary the speed of motor 41, relative to the position of the scale plate, I employ the electrical arrangement illustrated diagrammatically in Figure 3. The numeral 52 indicates a photo-electric amplifying relay, which I employ to prevent sparking between the contacts 9 and 5, controlled by the movement of the scale beam 2, and shown diagrammatically at the right of Figure 3. The main line wires are indicated by the numerals 53 and 54. The wire 53 leads directly to the input of the amplifying device 52. The wire 54 is connected in series through the switches of a cut out, 57, having switch members, 55, and 56. To this end the wire 54 is connected to the fixed contact, 58, of the switch member 55 and from the fixed contact, 59, of switch member 56 a branch wire, 60, forming, in effect, a continuation of the main wire 54, leads to the contact 9. The switch members 55 and 56 are connected by a wire 60a. When the contact 9 engages the spring contact 5 the circuit is closed from wire 60 through a branch wire, 61, to the input of the amplifier. Located in the length of the wire 60 is a main operating switch, 62, which may be opened and closed at the will of the operator. The amplifying relay of the amplifier is indicated at 62a and controls a switch point, 63, operating between two contacts 64, and 65, but normally in engagement with the contact 64. This position of the switch closes the circuit to the brushes, 66, of the variable speed motor around a rheostat, 67. The switch point 63 is adapted to be moved to break engagement with the contact 64 and make engagement with the contact 65 by means of a bell-crank lever, 68, one member of which acts as an armature to the magnet of the relay. The circuit to the brushes 66 is, on one side, over a wire, 53a, leading from the main wire 53, and, on the other side, over a wire, 64a, leading from the contact 64. A branch wire, 67a, connects this latter wire with one end of the rheostat 67. The other connection to the rheostat is over a wire, 67b, which connects with the continuation 60 of the main line wire 54. A branch wire, 63a, connects switch point 63 with wire 67b, and a branch wire, 65a, connects the contact with the main line wire 53.

The reversing motor 51 may be of any preferred type, such as a two-pole reversing motor having a main field coil and two sets of shading coils, one for each direction of rotation. When one set of coils is short circuited, a current flows in them and the motor runs in one direction. When the other set of coils is short circuited, the motor runs in the opposite direction. For simplicity of illustration, in the diagrammatic view, Figure 3, I have indicated these units of the reversing motor, as separate motors, the one 69, being in effect a reversing motor operating to slow down the speed of motor 41, and the other, 70, being a speed-up motor, operating to shift the brushes of the motor 41, to increase the speed of rotation thereof. The motors 69 and 70 have a common field coil, 71, constantly in circuit with the main line wires 53 and 60 by means of the wires 72 and 73. The circuits to the motors 69 and 70 are controlled by a reversing relay, indicated generally by the numeral 74, the armature, 75, of the magnet of which controls the movement of a switch point, 76 which operates between contacts, 77 and 78. The relay 74 is interposed in the length of the wire 65a, before referred to. Normally, that is to say, with the contacts 9 and 5 open, as shown, the switch point 76 will be in engagement with the contact 78, which through the medium of wire, 79, leading from the contact 78, and wire, 80, leading from the switch point 76, closes the circuit to motor 70, which operates the reversing motor 51 in a manner to shift the brushes 66 and cause the movement of motor 41 to be accelerated. In the diagrammatic view, the shifting member 47 for the brushes 66 is shown in the form of a bar mounted on one end of the shaft, 81, of the reversing motor, so that these brushes will be shifted in one direction or the other according to the direction of rotation of motor 51.

In operation, the position of the parts being as shown in Figures 1 and 2, the scale plate 22 has moved upward under a lessened weight of grain, to open contacts 5 and 9, the rheostat 67 and motor 69 have been cut out, the circuit to motor 70 closed, and the reversing motor 51 will now operate shaft 81 in a direction to shift the brushes 66 in a direction to speed up motor 41 and thereby, through the sprocket drive to shaft 31, increase the speed of operation of feeder 32. This continues until the increased flow of grain over slide 35 causes the scale plate to move downward, which causes spring contact 5 to engage the contact 9. This operates to close the circuit through the amplifier 52 to relay 62a, and armature 68 will engage switch point 63, breaking engagement thereof with contact 64, and moving it into engagement with contact 65. This cuts in the rheostat 67, energizes relay 74, which actuates armature 75 to move the switch point 76 into engagement with contact 77, thereby breaking engagement with contact 78, breaking the circuit to motor 70 and closing the circuit to motor 69. The latter causes the shaft of the reversing motor to rotate in the opposite direction to that first described, as shown by the arrows, thereby shifting brushes 66 to slow the speed of motor 41, which action is accentuated by the fact that the rheostat 67 having been cut into the circuit of the motor, weakens the field thereof. This results in slowing down the feeder 32, which condition continues until the lessened weight of grain falling on the scale plate 22 permits the weights 13 to overbalance scale beam 2 and raise the scale plate, thereby breaking engagement between the contacts 5 and 9, whereupon the operation first described again occurs.

The alternations in the speed of motor 41, and consequently of feeder 32, occur with uniform regularity, and the durations of time in which the scale plate remains in one position or the other, are also approximately equal. It is to be understood, however, that the limits of movement of the scale plate are established by the definite variations in the weight of the grain falling thereon, and not by mechanically stopping said plate in one position or the other, so that, as previously stated, as long as grain is flowing through the device the scale plate is maintained in a condition of unstable equilibrium.

Figure 4:
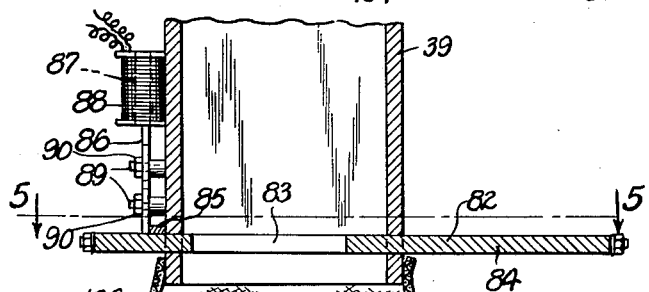
Figure 4 is a vertical sectional view of the lower end of the discharge spout, showing a valve, and its control applied thereto, for use in sacking grain, the valve being shown open.
Figure 5:
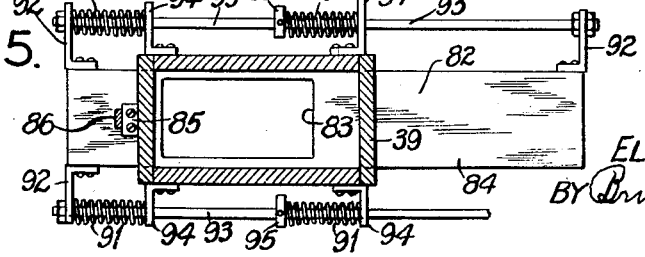
Figure 5 is a sectional view on the line 5—5 of Figure 4, showing the springs for operating the valve.

Referring to Figures 4 and 5, in order to utilize my improved weighing device for sacking grain, in connection with the weight indicating mechanism associated with the device, and to be later described, I slidably mount in the lower end of chute 39 a valve, 82, having an opening, 83, therein through which grain discharges, and a solid portion, 84, for shutting off the flow of grain. Mounted on this valve is a stop, 85, which is adapted to engage behind the lower end of a vertically movable bar, 86, secured to the lower end of the core, 87, of a solenoid, 88. The bar 86 is mounted to slide on guide pins, 89, secured on the side of the chute 39, said pins having nuts, 90, secured on their outer ends which hold the bar 86 in its vertical position against pressure exerted thereon by the stop 85. This pressure is produced by springs, 91, the function of which is to cause the valve 82 to be instantly moved to shut off the flow of grain when the bar 86 is moved out of the path of stop 85. As shown, I mount on each side of the valve 82, at opposite ends thereof, brackets, 92, in which are secured rods, 93, which are adapted to slide in guide plates, 94, mounted on opposite sides of chute 39. Interposed between one set of guide plates 94 and the brackets 92 at the inner end of the valve, is one set of springs 91; and interposed between the other set of guide plates 94 and collars, 95, secured on the respective bars 93, is a second set of springs 91. It will be readily seen that when the bar 86 is raised to release stop 85, the power of the springs 91 will be exerted to instantly move the valve 82 to a closed position, or to the left in Figure 5.

One end of the coil of the solenoid 88 is connected by a branch wire, 88a, to the wire 60 and the other end of said coil is connected by a wire, 88b, to a movable point, 96, which is adapted to make and break engagement with a contact, 97, connected by a branch wire, 97a, with the main line wire 53. The switch point is adapted to be actuated periodically by the weight indicating mechanism, which comprises a constant-speed motor, 98, one side of which is connected by a wire, 99, with the main wire 53 and the other side of which is connected by a wire, 100, with the continuation 60 of the main line wire 54. The shaft, 101, of motor 98, actuates a counter, 102, of the Veeder type, which latter is also caused to actuate a shaft, 103, at a constant speed. On the end of shaft 103 is a disk, 104, having a pin, 105, mounted thereon which, in the rotation of the disk, is adapted to engage the switch point 96 to move it into engagement with contact 97, and then to release said switch point so that it will break engagement with said contact. The counter 102, by the use of change gears, may be adapted to indicate any rate of flow for which the machine may be adjusted, and the revolutions of the disk 104 may be correspondingly regulated in periodicity according to the weight of grain to be placed in each sack. Ordinarily, the counter 102 would be set for a flow of forty pounds of grain per minute, and will register forty times per minute. If each sack is to be supplied with, say, 100 pounds of grain, then the disk 104 would make one revolution in two and one-half minutes.

It will be readily seen that the synchronous motor 98, combined with the counter 102, in effect constitutes a timepiece, except that the elements of the counter indicate pounds. Hence, a clock could be substituted for the constant speed motor 98 and the counter, if desired. With the device adjusted to a flow of forty pounds per minute, to get the weight of grain it would simply be necessary to multiply the number of minutes the device was run by 40, to secure the weight of grain passing through the machine. However, I consider the use of a counter preferable, by reason of the fact that the weight of grain passing through the machine over a period of days is totalized by the counter.

The scale proper I prefer to employ is one of a well-known make, which I have modified in certain particulars to adapt it to the purposes of my invention, principally by projecting the scale beam 2, and adding the arms 3 and 8 for the purpose of the make and break contact in the circuit of the variable speed motor. Such a scale has a tower, 107, which houses a balance indication pointer, 108, movable in one direction or the other over a graduated plate, 109, the position of the pointer to one side or the other of a central true weight indication, 110, showing deviations from such true weight. Such an indicator is not essential to my invention, but it is useful in enabling one to balance the scale and to see at a glance the rate and extent of vibration of the scale plate 22, which would, of course, effect corresponding vibrations of the pointer 108. It may be stated that the vibrations of the scale plate occur within a range of two degrees.

With the device arranged as described, and it being desired to sack the grain passing through the device, the operator would place a sack, 106, over the mouth of the chute 39 and close switch 62 to place the machine in operation. With each revolution of the disk 104 the switch point 96 would be moved into engagement with contact 97 thereby energizing the solenoid 88 and causing the core 87 to rise. This raises the bar 86 above stop 85, and the springs 91 cause the valve 82 to instantly shut off the flow of grain. The sack is removed, a new sack substituted and the valve 82 moved back to the open position shown, the actuating pin in the meantime having passed off the switch point 96 to open the contact at 97, thereby deenergizing the solenoid and permitting the bar 86 to fall. In actual experience, I have found that, both in indicating the weight of flowing grain by the counter, and supplying a given weight of grain to each sack, when the device is used for that purpose, my device is accurate to within a fraction of one per cent.

Referring now to the cut out device 57, I have shown, conventionally, in Figure 1 means for actuating this cut out device if, for any reason, there should be either a stoppage of the flow of grain, or a continued diminished flow thereof, on the one hand; or, on the other, if there should occur a continuous abnormal flow of the grain. The former conditions might occur, for example, by the grain becoming blocked entirely or partially in bin 28 or spout 29, or by the supply of grain in the bin becoming exhausted. The latter condition, that is, a condition of abnormal flow of grain, might be occasioned by a weight being accidentally knocked off of the scale platform 12. In the case of a continuous diminished flow of grain or a cessation of the flow, the motor 70 would continue to speed up the reversing motor 51, the shaft 81 being actuated thereby in one direction until a crank arm, 111, mounted on said shaft engages the switch member 56 and opens the main line circuit, when the operation will be stopped.

In the case of a continuous abnormal flow of the grain, the motor 69 would operate to continuously rotate the reversing motor 51 in the opposite direction to that just described, the shaft 81 rotating until the crank arm 111 engages the switch member 55 to break the main line circuit to stop the operation of the mechanism.

In order that the method hereinafter broadly claimed may be better understood, I think it desirable to refer to the manner in which the weight force of the grain and the relation of the scale plate thereto are utilized in insuring that the total weight units on the scale will be the same with different characters of grain. As is known, the weight force is the product of the weight applied and the distance it is applied from the fulcrum. According to my arrangement, the total impact weight value is the product of the distance the grain flows to gain momentum and the distance that the force is applied from the fulcrum of the scale plate. This is approximately 50% of the total weight force applied to the scale plate. The remaining 50% is represented by the weight of the grain on the scale plate as it flows off, multiplied by the distance this weight is applied from the fulcrum. These proportions hold true with reference to a standard grain. In this case, the standard is considered to be wheat of about 60 pounds test weight to the bushel of commercial grade. If with this standard, the total weight on the scale plate is 50% impact and 50% dead weight, then with grain of other characteristics, the percentage of impact weight and dead weight would vary. If, for example, the grain flows 10% slower, the impact would be 10% less; but the grain on the scale plate would, for the same reason, also flow 10% slower, thus adding 10% to the dead weight value. Therefore, the total weight units on the scale would be the same in either case.

In all batch weighing automatic scales of which I am aware, the impact of the flowing grain on the scale is neutralized manually, as by manipulating weights on the scale. For example, in sacking grain, if the scale is adjusted to automatically cut off at 100 pounds, it will be found that if the weight on the scale beam is adjusted for weighing 100 pounds, when the flow is stopped it will be found that to balance the scale, the weight must be moved inward to, say, 98 pounds, showing that two pounds of the indicated weight was due to impact. Therefore, the weight will be moved to weigh 102 pounds, in the subsequent operations of the scale. The scale will then weigh correctly as long as the material flowing runs at the same rate as when the test was made, or the bulk of grain does not change with reference to its weight, so that the material in the hopper stands at the same height when the cut off is made. Any variations, however, in the rate of flow will result in inaccurate weight indication. In no case, so far as I am aware, is the impact weight factor of flowing grain eliminated automatically.

According to my invention, instead of the impact of the grain being an undesirable factor, it is made to serve a useful purpose by entering into the determination of weight, thus enabling me to compensate for variations in the characteristics of grain.

It remains to explain how the entire scale mechanism and the electrical circuit are brought into balance. When the indicator 108 on the scale beam member is in a central position at 110, this shows that not only the scale beam is perfectly balanced, but that being directly connected to the scale plate 22, the latter is also in the correct position, that is, resting at an angle of about 45°. But equally important is the fact that at this balanced position the contacts 5 and 9 of the scale are so adjusted that the circuit is alternately opened and closed. If these contacts touch, the circuit is closed; if they do not touch, the circuit is open. There is no half way point, or condition of static balance, so to speak; but such half way point is indicated by the alternate making and breaking of the circuit.

It may be pointed out that my improved mechanism will automatically adjust itself to current variations by an automatic change or correction in the speed of the motor. The same is true as to any other causes, such as failure to properly oil the motor or feeder bearings, which tend to change its speed, the motor speed depending on the torque.

It will be understood that in describing the mechanism employed in carrying out my invention, I do not thereby intend to limit myself to the precise details of construction referred to, but that the same are susceptible of refinements, variations and changes in form without departing from the principle of my invention, or the broad idea thereof as outlined in the following claims.

I claim:

1. The method of determining the weight of flowing grain which comprises directing a flow of grain to cause it to impinge on and flow over a scale plate and thereby maintain the same in a state of unstable equilibrium against resistance of weight calculated for a predetermined flow, and so relating the scale plate to the momentum of the grain impinging thereon and the dead weight of the grain while flowing therefrom that, for a given standard of grain, the impact weight value of the grain on the scale plate will substantially exactly equal its dead weight value.

'2. The method of determining the weight of flowing grain which comprises directing a flow of grain to cause it to impinge on and flow over a scale plate and thereby maintain the same in a state of unstable equilibrium against resistance of weight calculated for a predetermined flow, and maintaining equality in the total weight units on the scale plate by so relating the scale plate to the momentum of the grain impinging thereon and the dead weight of the grain while flowing therefrom that, for a given standard of grain, the impact weight value of the grain on the scale plate will substantially exactly equal its dead weight value and with grain differing in characteristics from standard, a variation in the impact weight value of the grain on the scale plate will be neutralized by a compensating variation of the dead weight value of the grain on the scale plate.

3. The method of determining the weight of flowing grain which comprises directing a flow of grain produced by an enforced feed thereof to cause it to impinge on and flow over a scale plate and thereby maintain the same in a state of unstable equilibrium against the resistance of weight calculated for a predetermined rate of flow, so relating the scale plate to the momentum of the grain impinging thereon and the dead weight of the grain while flowing therefrom that, for a given standard of grain, the impact weight value of the grain on the scale plate will substantially exactly equal its dead weight value, whereby a variation in the impact weight value of the grain on the scale plate will be neutralized by a compensating variation of the dead weight value of the grain thereon, and utilizing changes in the position of the scale plate, produced by variations in the rate of flow of the grain to the scale plate, to produce compensating changes in the rate of feed of the grain to cause such variations to occur uniformly and periodically, thereby to maintain a uniform flow of grain to the scale plate.

4. In a system of weighing flowing grain, the method of securing a uniform rate of flow of grain to a scale plate constituting one member of a scale which consists in forcibly feeding the grain and directing its flow in a manner to cause it to continuously impinge on and flow from said scale plate, periodically and uniformly changing the rate of feed and the resultant quantitative flow of the grain to the scale plate to cause it to vibrate between two positions in unison with which such changes of flow, and controllably producing the changes in the rate of feed of the grain by such changes in the position of the scale plate.

5. The method of determining the weight of flowing grain which consists in producing a uniform rate of flow thereof, whose weight per unit of time will be established, by forcibly feeding the grain and directing its flow in a manner to cause it to continuously impinge on and flow from a scale plate, and thereby place said scale plate in unstable equilibrium against resistance of weight calculated for a predetermined flow, so relating said scale plate to the momentum of impinging grain of a given standard and the dead weight of the grain while flowing from the scale plate, that the impact weight and the dead weight of the grain on the scale plate shall be equal, periodically and uniformly changing the rate of feed and the resultant quantitative flow of the grain to the scale plate to cause it to vibrate between two positions in unison with such changes of flow, and controllably producing the changes in the rate of feed of the grain by the changes in the position of the scale plate.

6. Mechanism for use in determining the weight of flowing grain comprising, in combination, two inclined planes, one of which is in the form of a fulcrumed plate forming a part of a scale and positioned to receive by impact grain flowing from the other plane, the distance the grain flows to the fulcrumed scale plate, and the degree of incline and co-efficient of friction of the surface of the plane over which it flows, and the effective distance from its fulcrum the grain impinges upon the scale plate, the distance the grain flows on the scale plate, the degree of incline and the co-efficient of friction of the surface of the latter, and the effective distance of flow on the scale plate from the scale plate fulcrum, being in such proportions that approximately one-half of the total weight of the grain on the scale plate will result from the impact force of the grain impinging thereon, and one half of such total weight will result from the dead weight of the grain flowing therefrom.

7. Mechanism for use in determining the weight of flowing grain comprising, in combination, two inclined planes, one of which is in the form of a fulcrumed plate of a scale positioned to receive by impact grain flowing from the other plane, and adapted to be thereby placed in a state of unstable equilibrium against the resistance of weight calculated for a predetermined flow, the fulcrumed plate having such proportions and being so related to the other plane, that the impact weight value of the grain flowing from said other plane and impinging on said plate, and the dead weight value of the grain flowing therefrom, shall be approximately equal.

8. Mechanism for use in determining the weight of flowing grain comprising, in combination, two inclined planes, one of the planes being in the form of a fulcrumed plate and being positioned to receive by impact the grain caused to flow over the other plane, a scale beam to which said plate is operatively connected and weighted to a predetermined amount to maintain said plate in a state of unstable equilibrium under the weight of the flowing grain, said scale plate having such proportions and being so related to the other plane that the impact weight value of the grain flowing over said other plane to said scale plate shall substantially equal one-half the impact weight value plus the dead weight value of the grain on said plate, and the impact weight value, and the dead weight value, of the grain on the scale plate shall be approximately equal.

9. Mechanism for weighing grain in a flowing stream comprising, in combination, a scale beam weighted to a predetermined amount, an inclined scale plate operatively connected thereto, feeding mechanism for delivering a stream of grain to said scale plate to cause it to flow over and from the latter by gravity and thereby place the scale plate in a state of unstable equilibrium against the resistance of the scale beam, the scale plate being movable between two operative positions by variations in the weight of the grain impinging thereon, and variable speed driving mechanism operating the feeding mechanism and controlled as to speed by changes in position of said scale plate, whereby to increase or decrease the rate of feed of the grain as the rate of flow thereof to the scale plate falls below or exceeds a given rate of flow and produce an aggregate stream whose weight per unit of time will be established.

10. Mechanism for weighing grain in a flowing stream comprising, in combination, an inclined fulcrumed scale plate normally overbalanced by a predetermined amount of weight, an inclined surface over which a stream of grain is directed to fall on to said scale plate and thereby place and maintain the same in a state of unstable equilibrium, said scale plate and inclined surface having such relation and relative proportions that the impact weight value of the grain flowing over said inclined surface shall be equal to one-half the impact weight value plus the dead weight value of the grain on said scale plate, feeding mechanism for delivering grain to said inclined surface, a variable speed device for operating said feeding mechanism, and means controlled by movements of said scale plate to vary the speed of said speed device and thereby uniformly vary the feed of grain to said inclined surface in response to changed positions of the scale plate effected by changes in the quantitative flow of grain over said inclined surface, whereby to produce an aggregate stream whose weight per unit of time will be established.

11. Mechanism for weighing grain in a flowing stream, comprising, in combination, a scale beam, an inclined movable scale plate operatively connected to said beam, feeding mechanism for supplying a stream of grain to said scale plate to cause it to flow over and from the same by gravity, variable speed mechanism for driving said feeding mechanism, a make and break contact in the circuit of the variable speed mechanism controlled by the movements of said scale beam, the latter being weighted to require a given quantitative feed of grain to the scale plate to overbalance the beam, whereby the weight of a flow of grain to the scale plate effective to overbalance the scale beam will cause said contact to be closed and produce a decrease in the flow of grain to the scale plate, thereby lightening the load thereon and permitting the scale beam to move toward its original position and break said contact, to cause the variable speed mechanism to speed up the feeding mechanism to increase the quantitative flow of grain to the scale plate, the latter being thus caused to vibrate between two positions and produce a flow of grain which definitely alternates above and below a desired rate of flow determined by the amount of weight applied to said scale beam, and aggregating said rate of flow, and registering mechanism operating in synchronism with such rate of flow for indicating the weight of grain.

12. Mechanism for weighing grain in a flowing stream comprising, in combination, a scale beam, an inclined movable scale plate operatively connected to said beam, feeding mechanism for supplying a stream of grain to said scale plate to cause it to flow over and from the same by gravity, the length of flow of the stream of grain to the scale plate being so proportioned relative to the proportions of the scale plate that the impact weight value of the grain for such flow will equal one-half the impact weight value of the grain on the scale plate plus the dead weight value of the grain flowing over said scale plate, variable speed mechanism for driving said feeding mechanism, a make and break contact in the circuit of the variable speed mechanism controlled by the movement of said scale beam, the latter being weighted to require a given quantitative feed of grain to the scale plate to overbalance the beam, whereby the weight of a flow of grain to the scale plate effective to overbalance the scale beam will cause said contact to be closed and produce a decrease in the flow of grain to the scale plate, thereby lightening the load thereon and permitting the scale beam to move toward its original position and break said contact to cause the variable speed mechanism to speed up the feeding mechanism and increase the quantitative flow of grain to the scale plate, the latter being thus caused to vibrate between two positions and produce a flow of grain which definitely alternates above and below a desired rate of flow determined by the amount of weight applied to said scale beam, and aggregating said rate of flow, and registering mechanism operating in synchronism with such rate of flow for indicating the weight of grain.

13. Mechanism for weighing grain in a flowing stream, comprising, in combination, a weighted scale beam, a movable scale plate operatively connected to said beam, feeding mechanism for supplying a stream of grain to said scale plate, variable speed mechanism for driving said feeding mechanism, a make and break contact in the circuit of the variable speed mechanism controlled by the movement of said scale beam, the latter being weighted to require a given quantitative feed of grain to the scale plate to overbalance the beam, whereby the weight of a flow of grain to the scale plate effective to overbalance the scale beam will cause said contact to be closed and produce a decrease in the flow of grain to the scale plate, thereby lightening the load thereon and permitting the scale beam to move toward its original position and break said contact, to cause the variable speed mechanism to speed up the feeding mechanism and increase the quantitative flow of grain to the scale plate, the latter being thus caused to vibrate between two positions and produce a flow of grain which definitely alternates above and below a desired rate of flow determined by the amount of weight applied to said scale beam, and aggregating said rate of flow, registering mechanism operating in synchronism with such rate of flow for indicating the weight of grain, a rheostat in the circuit of the variable speed mechanism, and automatic electrical devices operating to cut out said rheostat to decrease the resistance in said circuit when said contact is opened to speed up the variable speed driving mechanism, and to cut in said rheostat to increase the resistance in said circuit when said circuit is closed.

14. In a scale for weighing flowing grain, a scale plate adapted to receive the flow of grain, and so proportioned relative to the momentum of the grain impinging thereon and the dead weight value of the grain flowing therefrom, that the impact weight value of the grain on the scale plate and the dead weight value of the grain flowing therefrom will be equal.

15. In a scale for weighing flowing grain, an inclined pivoted scale plate adapted to receive the flow of grain and movable by variations in the weight of the grain to control the flow thereof, said scale plate being so proportioned relative to the momentum of the grain impinging thereon and the dead weight value of the grain flowing therefrom that the impact weight value of the grain on the scale plate, and the dead weight value of the grain flowing therefrom will be equal.

16. In a machine for weighing flowing grain, in combination with means for directing a flow of grain, an inclined pivoted scale plate positioned to receive by impact the flowing grain, said scale plate being so proportioned that the dead weight value of the grain flowing from a point of impact thereon to its lower end will equal the impact weight value of the grain on the scale plate, and the impact weight value of the grain for its directed length of flow will equal one-half the impact weight value plus the dead weight value of the grain on the scale plate.

17. In a machine affording a uniform rate of flow of grain, constant speed registering mechanism synchronized with said rate of flow to determine the weight per unit of time, a discharge chute for the grain, a spring actuated valve mounted on said chute, electrically operated stop mechanism normally holding said valve open and actuating mechanism operated by said registering mechanism to release said stop mechanism and permit said valve to close and cut off the flow of grain from said chute, said actuating mechanism operating continuously to effect release of said stop mechanism at equal intervals of time.

18. In a machine affording a uniform rate of flow of grain, constant speed registering mechanism synchronized with said rate of flow to determine the weight per unit of time, a discharge chute for the grain, a spring actuated valve mounted on said chute, a slidable member normally holding said valve open, a solenoid having a core connected to said member, an electric circuit for said solenoid, a switch in said circuit normally maintaining the same open, and actuating mechanism operated by said registering mechanism to close said switch and thereby energize the solenoid to raise its core and move said member to release the valve and permit the same to close and cut off the flow of grain from said chute, said actuating mechanism operating continuously to close said switch and then permit the same to open at equal intervals of time.

19. Mechanism for weighing grain in a flowing stream, comprising, in combination, a weighted scale beam, a movable scale plate operatively connected to said beam, feeding mechanism for supplying a stream of grain to said scale plate, variable speed mechanism for driving said feeding mechanism, including a reversing motor, a make and break contact controlling the circuits of the reversing motor and operated by the movements of said scale beam, the latter being weighted to require a given quantitative feed of grain to the scale plate to overbalance the beam, whereby the weight of a flow of grain to the scale plate effective to overbalance the scale beam will cause said contact to be closed and produce a decrease in the flow of grain to the scale plate, thereby lightening the load thereon and permitting the scale beam to move toward its original position and break said contact, to cause the variable speed mechanism to speed up the feeding mechanism to increase the quantitative flow of grain to the scale plate, a main line circuit for supplying the circuit of said reversing motor, a cut-out in said main line circuit, and means operated by said reversing motor to actuate said cut-out to open the main line circuit and stop the operation of the mechanism, should said reversing motor be caused by an abnormal increase or decrease in the rate of flow of the grain, or a cessation of the flow of grain, to the scale plate, to continue rotation in either direction beyond a given point.

20. Mechanism for use in determining the weight of flowing grain, comprising, in combination, an inclined grain slide, a fulcrumed scale plate inclined at an equal angle with said slide in the opposite direction and located in front of and at a distance from said slide to receive by impact grain flowing therefrom, said slide and scale plate having equal coefficients of friction, the scale plate being adapted, under changes in the rate of flow of grain thereto, to vary its position, mechanism controlled by differing positions of the scale plate to effect uniform periodic changes in the rate of flow of grain over said slide, the distance the grain flows from a point of origin on the slide to a point of impact with the scale plate being so proportioned relative to the length of said scale plate and the distance of said point of impact from the fulcrum of the scale plate, that for a selected standard of grain, the impact weight, and the dead weight, of the grain impinging on and flowing over and from the scale plate shall be substantially equal.

21. The method of determining the weight of flowing grain which comprises directing a flow of grain to cause it to impinge on and flow over a scale plate and thereby maintain the same in a state of unstable equilibrium against resistance of weight calculated for a predetermined flow and, for a given standard of grain, maintaining an equality on said scale plate between the impact weight value of the grain relative to the momentum of flow and its dead weight value while flowing from the scale plate.

ELMER L. HENSON.